June 14, 1932.  A. M. CAMPBELL  1,863,005

DEVICE FOR MEASURING AND SUBMITTING MATERIAL TO MACHINES

Filed March 27, 1931  2 Sheets-Sheet 1

Inventor
Acheson M. Campbell
By
Attorneys

June 14, 1932.  A. M. CAMPBELL  1,863,005
DEVICE FOR MEASURING AND SUBMITTING MATERIAL TO MACHINES
Filed March 27, 1931   2 Sheets-Sheet 2

Inventor
Acheson M. Campbell

Patented June 14, 1932

1,863,005

UNITED STATES PATENT OFFICE

ACHESON M. CAMPBELL, OF HAMILTON, OHIO, ASSIGNOR TO THE MOSLER SAFE COMPANY, OF HAMILTON, OHIO, A CORPORATION OF NEW YORK

DEVICE FOR MEASURING AND SUBMITTING MATERIAL TO MACHINES

Application filed March 27, 1931. Serial No. 525,826.

This invention relates to a device for submitting lengths of bars or plates to a machine such as a cutter, drill, or the like, and which device is adapted to very accurately measure and submit to such machine a predetermined portion of the bar or plate.

An object of the invention is to provide a novel carriage for movement along a rail or bed disposed adjacent the cutter or like machine, whereby the above may effectively be accomplished with a minimum of time and labor.

Another object is to provide in combination with a reciprocable carriage and a support therefor a simple and very accurate measuring and adjusting means whereby the work "A" may be accurately presented to the cutter or other tool "B" and operated upon at a predetermined location thereon without marking upon or manually measuring off the work.

A further object is to provide the carriage with a novel type of work clamping means so related to the carriage and its adjusting and measuring means that any work held thereby will have visibly indicated on the measuring means the distance between one of its ends and the cutter element.

These and other objects are attained by the means described herein and disclosed in the accompanying drawings, in which.

Figure 1:
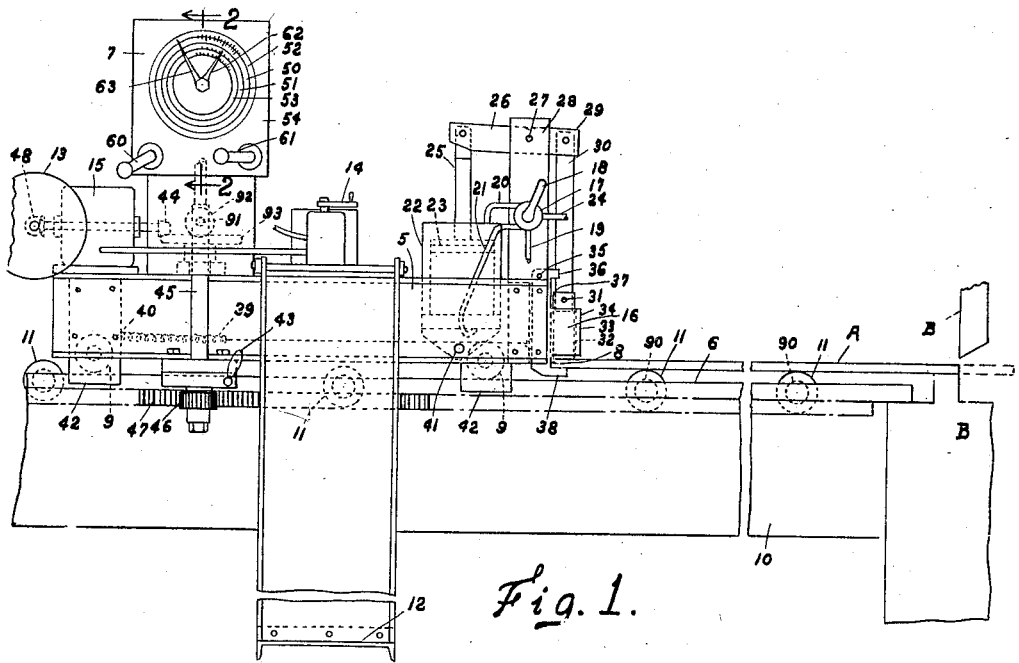
Fig. 1 is a side elevational view of the device of the invention.

Prior to this invention it was customary to measure and mark the plates or bars "A" before submitting them to the cutters or shears "B". The marking ordinarily was made with a chalk line which rendered it difficult to position the work "A" relative to the cutter, and as a result it was necessary to allow a considerable margin of safety so that the plate could not be cut off too short. It was necessary thereafter to grind or plane off the excess metal allowed as a safety margin.

According to the present invention however, the work "A" is moved toward the cutter by means of a carriage 5 mounted for movement along a rail 6 and having associated therewith a very accurate indicating and indexing means shown generally at 7. By means of the mechanism 7, is secured a visible and very accurate indication of the distance between the stock abutting face 8 of the carriage and the cutter or other tool element "B". Said means is adapted also to directly indicate the distance that the stock extends beyond said tool element or cutter.

The carriage 5 may be mounted for longitudinal movement along the rail 6 in any suitable manner, for example, antifriction rollers 9 may be employed for the purpose. The rail 6 is disposed longitudinally of the stock supporting table or bed 10, which table or bed, if desired, may be provided with antifriction rollers 11 for directly supporting the heavy metal plates or bars "A", which is common practice. The carriage is provided with an operator's platform 12, from which the operator has access to the manual means 13 for reciprocating the carriage, and to the controller 14 whereby the carriage is moved by power from an electric motor 15.

Associated with the carriage are one or more clamping devices 16 whereby the work "A" may be secured to the carriage for movement therewith longitudinally of the work supporting table. The operation of the clamping device or devices is controlled preferably by means of a manually operable fluid pressure valve 17 having a control handle 18. As indicated in Fig. 1, the valve 17 has a fluid or compressed air inlet pipe 19 which may be placed in communication, by means of the handle 18, with either of the pipes 20 or 21. Pipe 20 directs fluid under pressure to the top end of the piston chamber 22, and pipe 21 may direct it to the lower portion of said chamber. From the foregoing it should be apparent that by operating the valve, the piston 23 may be reciprocated within the cylinder. An exhaust for the cylinder is indicated at 24. The reciprocable piston rod 25 has pivotal connection with one end of a rocker arm 26 pivoted at 27 upon a suitable standard 28 supported by the carriage. The opposite end 29 of the rocker arm has pivoted thereto a connecting rod 30, the lower end of which is pivoted, as at 31, to a block shaped clamp member or jaw 32 which is adapted for sliding reciprocating movement in a tubular guide portion 33 of the jaw support 34. The jaw support is pivoted to the carriage at 35 and it includes a lug or extension 36 projecting toward the connecting rod 30 and disposed in the path of movement of an abutment 37 on the movable clamp jaw 32. Integral with the pivoted member 34 is a clamp jaw 38 fixed relative thereto and extended to a position beneath the movable clamp means 32. It will become apparent as the description proceeds that the jaw 38 may be dispensed with in the event that the device is applied to a stock supporting table not provided with rollers 11.

The operation of the clamping device is as follows: First, attention is directed to the fact that the plates or bars "A" ordinarily are placed on the stock supporting table at a location considerably to the left of the carriage 5, and that said work is advanced forwardly toward the cutter along the anti-friction roller table. It is apparent therefore that the work must pass beneath the carriage in order to assume a position between the carriage and the cutter. Obviously then the jaw 38 of the clamping device requires movement to an elevated or inoperative position in order to permit the plate to pass beneath the carriage. This jaw preferably is integral with the pivoted member 34, which is adapted to move about its pivot 35. This pivotal movement is effected by means of upward movement of the connecting rod 30 by the action of the piston and rocker arm, since said upward movement causes the abutment 37 to strike and move the extension 36 of the pivoted clamp member. From the foregoing, it should be apparent that downward movement of the piston causes the member 34 to be elevated by reason of the counter-clockwise rotation thereof about its pivot 35. Upon actuating the valve 17 to effect raising of the piston 23, the clamp member 34 is lowered to the operative position shown by reason of a retractile spring 39 one end of which is secured to the clamp member and the other to a stationary part 40 of the carriage. It should be noted that when the abutment 37, in its downward movement, leaves the extension 36 on the clamp member, the movable jaw 32 begins to advance toward the stationary jaw or abutment 38 to clamp the work.

Converse downward movement of the piston will cause the member 32 to rise for unclamping the work, after which continued upward movement thereof will effect movement of the part 34 about its pivotal mounting 35, by reason of the action of abutment 37 upon the extension 36. It is to be understood that movement of the clamp device to the operative position indicated in Fig. 1, may be effected by gravity instead of by means of the spring 39. To compensate for rocking movement of the cylinder 22 during operation thereof, said cylinder may be pivotally mounted at 41 upon the frame of the carriage. Any suitable means such as guides 42 may be applied to the carriage for precluding lateral movement of the carriage on the rails. If desired, a manually operable clamp 43 may be provided for fixing the carriage in adjusted position relative to the rail. It is to be understood that the work clamping device may be operated by any suitable means such as fluid, air, or steam pressure, or by mechanical or electrical power.

The carriage may be moved toward and from the cutter or tool "B", by either manual or power means. The power means comprises the reversible motor 15 geared as at 44 for rotating a main power shaft 45 on which is fixed a driver pinion 46. The pinion permanently engages a rack 47 disposed longitudinally of the rail 6 and mounted upon the work supporting bed or table. Operation of the motor effects movement of the carriage along the rail as the pinion is rotated thereby. The manual means for moving the carriage may comprise a hand wheel 13 having a suitable geared connection with the main drive shaft or with the motor shaft as indicated at 48. The purpose of the manual carriage moving means is to provide for accurate adjustment of the carriage and the work relative to the cutter "B".

Means are provided for visibly and very accurately indicating the distance between the work abutting face 8 of the clamping devices and the cutter or other tool element "B", and said means is adapted also to directly indicate the distance that the stock extends beyond said tool element or cutter. Said means comprises the pairs of fixed graduated dials 50—51 and the adjustable or movable dials 52—53.

All of the dials may be disposed in a common plane as illustrated in the drawings. The graduated dials 50 and 51 may be fixed on the casing 54 of the indicating means by the use of screws 550 or the like, and any suitable means such as the rotatable extending shafts 55 and 56 may be provided for rotating the movable dials. One form of means for rotating the movable dials is shown, said means comprising ring gears 57 carried by the dial rings 52 and 53, which ring gears are engaged by pinions 58 and 59, the pinions being individually rotatable by hand by means of the operating handles 60 and 61 respectively. By referring to Fig. 3, it will readily be apparent that rotation of the operating handle 61 will effect rotational movement of the dial plate 52, and in a like manner the innermost dial plate 53 may be rotated by the gear 58 upon actuation of the handle 60. As stated before, the indicating dials or plates 50 and 51, which may in fact comprise a single plate marked to represent two adjacent plates, are fixed against movement relative to the casing 54.

Figure 2:
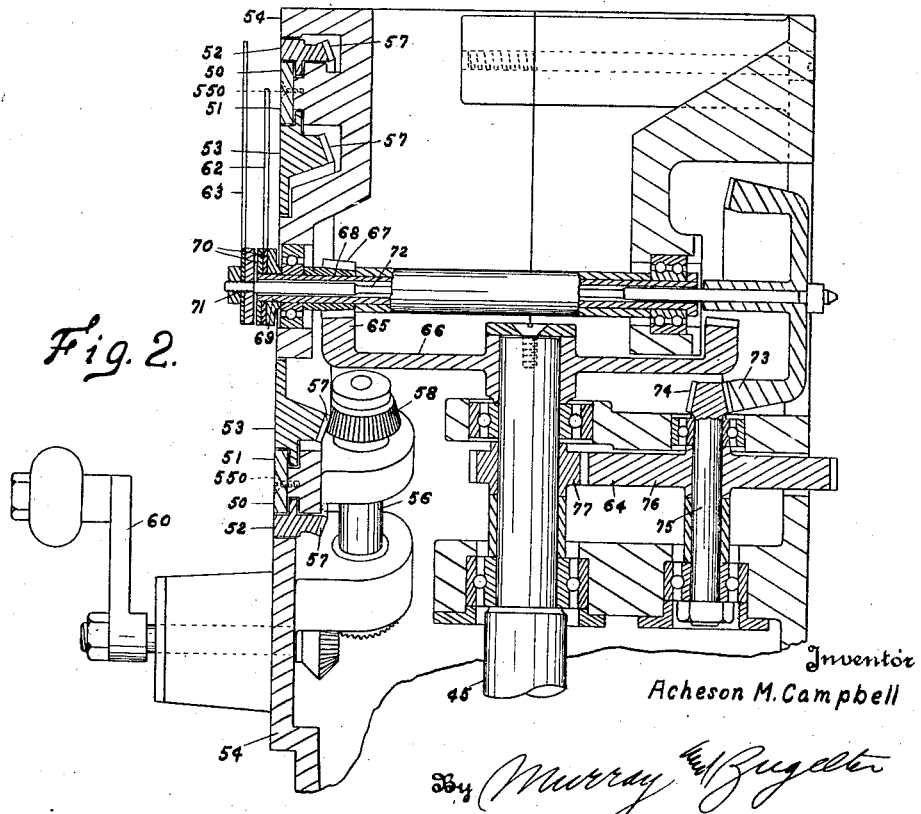
Fig. 2 is a cross-sectional view taken on line 2—2 of Fig. 1.

Concentrically with the dials are disposed cooperative indicating members which may be in the form of rotatable hands 62 and 63, which hands may be actuated in the following manner upon reciprocatory movement of the carriage. The power shaft 45 or a shaft driven thereby may extend up into the casing 54 as shown in Fig. 2. Associated with the shaft is a speed reduction gearing mechanism and a speed accelerating gearing mechanism, these being indicated generally at 64 and 65. The speed accelerating gearing may comprise a large ring gear 66 fixed to the shaft 45 and engaging a pinion 67 which is fixed to a rotatable sleeve 68 mounted in the casing and having fixedly mounted on an end 69 thereof the short indicating hand 62. The mounting may be effected by the use of a pair of threaded members 70 engaging the threaded end 69 of the sleeve and having the hand 62 clamped therebetween.

Figure 3:
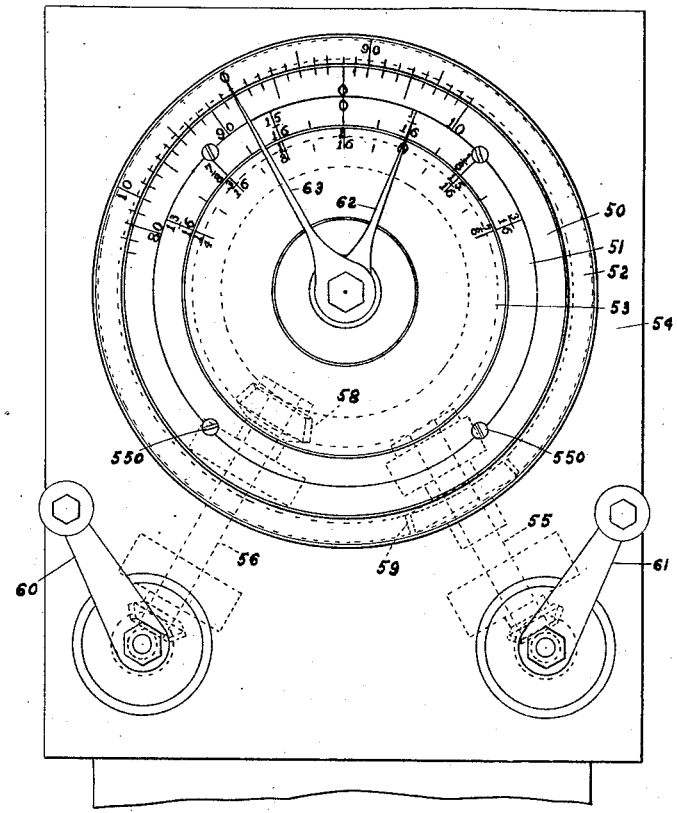
Fig. 3 is an enlarged front plan view of an indicating or indexing dial forming part of the invention.

The longer indicating hand 63 is fixed as at 71 to a central shaft 72 inclosed by the sleeve and having fixed thereto a large ring gear 73 which engages a pinion 74 forming part of the gear reduction mechanism. Pinion 74 may be mounted on a counter-shaft 75 having a large fixed gear 76 in mesh with a pinion 77 fixed on the main drive shaft 45. It should be apparent from the foregoing that slow rotation of the shaft 45 will effect a rapid rotation of the indicating hand 62, while at the same time the hand 63 will be moved very slowly. By way of illustration, Fig. 3 shows the dial plates 50 and 52 each calibrated to provide 100 equally spaced markings, the distance between each marking representing an inch of carriage movement along the stock supporting table; the dial plates 51 and 53 each are calibrated to show fractions of an inch. It will be understood therefore, that upon each complete rotation of the indicating hand 62, the longer hand 63 will move the distance of one space, or one-hundredth of the circumference of the dials 50 and 52. In other words, the carriage would have to be moved one-hundred inches along the bed of the machine in order to effect a complete rotation of the indicating hand 63; and simultaneously with that movement the shorter indicating hand 62 would rotate one hundred times. The arrangement of the gearing in the housing 54 preferably is such that movement of the carriage toward the right (Fig. 1) is accompanied by counterclockwise rotation of the indicator hands, and conversely, movement of the carriage to the left is accompanied by clockwise rotation of the indicating hands.

In Fig. 3 is illustrated the preferable manner of graduating the various dials 50, 51, 52, and 53 though it is to be understood that the units of measure may be meters and fractions thereof, instead of inches, and that the number of divisions on the dial plates 50 and 52 may exceed one hundred in number, if desired. To increase or decrease the number of divisions to be placed on the dials 50 and 52, it is necessary only to vary the amount of gear reduction between the main shaft 45 and the shaft 72 carrying the indicating hand 63. It will be observed that the divisions on dial plate 52 are numbered from 0 to 100 in a counterclockwise direction, while the corresponding divisions on stationary dial plate 50 are numbered in the opposite direction. Similarly the stationary dial plate 51 is calibrated to show fractions of an inch, and the divisions are numbered in a clockwise direction on the plate, whereas on the movable plate 53 the corresponding divisions are numbered in the counterclockwise direction.

The manner of using the indicating device is as follows. It is to be assumed that a length of work "A" is disposed upon the table or support 10, as indicated in Fig. 1, one end of the work being securely held by the clamp device 33 and the other end being disposed in close proximity with the cutter or tool "B". According to the reading of the indicator means, (see Fig. 3), the length of the work is "92 and $\frac{1}{16}$ inches", this being indicated by the pointers or hands with respect to their positions upon the stationary or fixed dial or index plates 50 and 51. It may be stated that the distance of the work clamp from the cutter B is always accurately indicated upon the fixed dials, regardless of the position of the carriage on the rails. For example, when the carriage is moved toward the cutter until the pointer 63 is at 80 on the fixed dial plate 50 while at the same time the pointer 62 is at "zero" on the fixed dial plate 51, the carriage will be exactly 80 inches from the cutter, this being measured from the abutment 8 to the cutter "B". Due to the provision of the speed accelerating gearing mechanism associated with the main shaft 45 and the pointer mechanism 62, the reading is accurate to approximately $\frac{1}{32}$ inch, and is readable directly from the device without computation.

Assuming now that, from the position indicated in full lines in Fig. 1 the work is to be moved past the cutter a distance of 5½ inches, the operator merely actuates the handles 60 and 61 for disposing the "zero" of dials 52 and 53 to a position directly behind the pointers 63 and 62, respectively, (as indicated in Fig. 3). Then, upon movement of the carriage toward the cutter until the readings on the movable dials 52 and 53, as indicated by the pointers, indicates a distance traveled of 5½ inches, the work will be found to extend 5½ inches beyond the cutter. It may be stated, therefore, that the readings on the movable dials or index plates, as indicated by the pointers, indicate directly and without computation the amount of bar or plate stock that will be severed from the bar or plate by the action of the cutter.

The foregoing completes the statement of operation of the indicating means, and the operation of the clamping device was explained previously. It is pointed out that the antifriction rollers 11 do not interfere with free longitudinal movement of the carriage while the clamping devices 38 are in the operative or lowered position, because the rollers are spaced, laterally of the bed or table, to provide ways or passages (indicated by dotted line 90) through which the jaws 38 may move during reciprocatory movement of the carriage. Also, it is pointed out that the rack and pinion arrangement shown at 46—47 may be duplicated on the opposite side of the machine so as to more evenly and perfectly move the carriage; and there is indicated at 91 and 92, respectively, a transverse shaft and gear whereby power from the gear 93 may be transmitted to the opposite side of the carriage for actuating the rack and pinion, on that side, which corresponds to the rack and pinion 47—46 shown in Fig. 1.

Under certain circumstances, the clamp device 33 may be eliminated or have substituted therefor merely an abutment such as 8 whereby the work may intermittently be advanced to the cutter or other tool "B" without being attached to the carriage.

It is to be understood that various other modifications and changes in structural details of the device may be made, within the scope of the claims, without departing from the spirit of the invention.

What is claimed is:

1. In a device of the class described the combination of a tool for operating upon material, a movable carriage and a supporting means therefor, an operator's station on the carriage and indicating means at the operator's station and movable bodily with the carriage for directly indicating the distance between the tool and a point on the carriage.

2. In a device of the class described the combination of a tool for operating upon material, a movable carriage for advancing the material toward and beyond the tool, a supporting means for the carriage, and means movable bodily with the carriage for directly indicating both the distance between the tool and a point on the carriage and the distance that the material is extended beyond the tool by the advancement of the carriage.

3. In a device of the class described the combination of a tool for operating upon material, a movable carriage for advancing the material toward the tool, a supporting means for the carriage, an operator's station on the carriage, means at the operator's station and movable with the carriage for indicating the distance between the tool and an end of the material advanced by the carriage, and cooperative means on the carriage and the carriage support for actuating the indicating means.

4. In combination a tool for operating upon material, a movable carriage for advancing the material toward the tool, a supporting means for the carriage, means for indicating the distance between the tool and an end of the material advanced by the carriage and comprising fixed and movable graduated members all movable bodily with the carriage, graduation indicator means movable bodily with the carriage and disposed for movement relative the fixed and movable graduated members, and means for moving the graduation indicator means as the carriage is moved along the carriage support.

5. In combination a tool for operating upon material, a movable carriage for advancing the material toward the tool, a supporting means for the carriage, means for indicating the distance between the tool and an end of the material advanced by the carriage and comprising fixed and movable graduated members all movable bodily with the carriage, graduation indicator means disposed for movement relative the fixed and movable graduated members, means for moving the graduation indicator means as the carriage is moved along the carriage support, and a material clamping means on the carriage movable bodily from a normal position adjacent the carriage supporting means.

6. In combination a tool for operating upon material, a movable carriage for advancing the material toward the tool, a supporting means for the carriage, means for indicating the distances between the tool and each end of the material advanced by the carriage and comprising a pair of graduated index members marked to indicate units of measure, both index members being movable bodily with the carriage, one of said index members being movable relative the other and having its markings indicated in a reversed order relative the other index member, graduation indicator means for directing attention to particular portions of the index members, and means for moving the indicator means relative to the graduated index members as the carriage is moved along the carriage support.

7. In combination a tool for operating upon material, a movable carriage for advancing the material toward the tool, a supporting means for the carriage, means for indicating the distances between the tool and each end of the material advanced by the carriage and comprising a pair of graduated index members marked to indicate units of measure, both index members being movable bodily with the carriage, one of said index members being movable relative the other and having its markings indicated in a reversed order relative the other index member, graduation indicator means for directing attention to particular portions of the index members, means for moving the indicator means relative to the graduated index members as the carriage is moved along the carriage support, and a material clamping means on the carriage movable bodily from a normal position adjacent the carriage supporting means.

8. In a device of the class described the combination of a tool for operating upon material, a movable carriage for advancing the material toward and beyond the tool, a supporting means for the carriage, and means for directly indicating both the distance between the tool and a point on the carriage and the distance that the material is extended beyond the tool by the adjustment of the carriage, said indicating means comprising a pair of marked unit-indicating index members and a pair of marked unit fraction-indicating index members, both pairs of index members being movable with the carriage, one of each pair of said members being mounted for adjustment relative to the remaining index members, the unit markings of the first pair of index members being in reversed order and the unit-fraction markings of the second pair of index members being in reversed order, a movable indicator hand associated with each pair of index members and mounted for movement adjacent and relative to the pairs of index members, and means for moving the indicator hands simultaneously at speeds bearing the same ratio as that existing between the number of complete units indicated on the unit and the fraction-unit index members.

9. In a device of the class described the combination of a carriage and a supporting means therefor relative to which the carriage may be moved, a table for supporting lengths of material to be moved along the table, a member on the carriage including an abutment for the lengths of material said abutment being disposed near the material-supporting table, and means for moving the abutment from its position in proximity with the table.

10. In a device of the class described the combination of a carriage and a supporting means therefor relative to which the carriage may be moved, means for supporting lengths of material, a member on the carriage comprising an abutment for the lengths of material and depending normally below the material supporting means, and controllable means for moving the abutment from its normal position to a position above and removed from the material supporting means.

11. In a device of the class described the combination of a tool for operating upon material, a movable carriage for advancing the material toward the tool, a supporting means for the carriage, an operator's station on the carriage, a clamp means for grasping the material to be operated upon, means at the operator's station and movable with the carriage for indicating the distance between the tool and an end of the material advanced by the carriage, and cooperative means on the carriage and the carriage support for actuating the indicating means.

In testimony whereof, I have hereunto subscribed my name this 24 day of March, 1931.

ACHESON M. CAMPBELL.